US 6,657,618 B2

(12) United States Patent  (10) Patent No.: US 6,657,618 B2
Moore  (45) Date of Patent: Dec. 2, 2003

(54) OPTICAL MEMORY UNIT FOR CAPTURING COMPLETE ANALOG MOTION

(75) Inventor: Eloise Moore, Cleveland, OH (US)

(73) Assignee: Eloise Gatewood-Moore, East Cleveland, OH (US)

( * ) Notice: Subject to any disclaimer, the term of this patent is extended or adjusted under 35 U.S.C. 154(b) by 154 days.

(21) Appl. No.: 09/768,111

(22) Filed: Jan. 23, 2001

(65) Prior Publication Data

US 2002/0097233 A1 Jul. 25, 2002

(51) Int. Cl.⁷ .................................................. G09G 5/00
(52) U.S. Cl. ...................... 345/179; 345/164; 345/165; 345/166; 345/180; 345/181; 345/182; 345/183; 178/19.01; 178/19.05; 382/311; 382/312; 382/314
(58) Field of Search ................................. 345/164–166, 345/179–183; 178/19.05, 19.01; 382/311–314

(56) References Cited

U.S. PATENT DOCUMENTS

| | | | |
|---|---|---|---|
| 4,128,889 A | | 12/1978 | Ojima et al. |
| 4,677,428 A | | 6/1987 | Bartholow |
| D303,124 S | | 8/1989 | Li |
| 5,027,115 A | * | 6/1991 | Sato et al. .................... 341/13 |
| 5,251,163 A | | 10/1993 | Rouhani |
| 5,294,792 A | * | 3/1994 | Lewis et al. ................ 250/221 |
| 5,301,222 A | * | 4/1994 | Fujiwara .................... 379/58 |
| 5,371,516 A | * | 12/1994 | Toyada et al. ............... 345/179 |
| 5,548,092 A | * | 8/1996 | Shriver ......................... 178/18 |
| 5,861,876 A | * | 1/1999 | Nakayama ................... 345/179 |
| 5,866,856 A | | 2/1999 | Holtzman |
| 5,883,622 A | | 3/1999 | Chan et al. |
| D413,871 S | | 9/1999 | McCormick |
| 5,995,084 A | | 11/1999 | Chan et al. |
| 5,995,123 A | | 11/1999 | McCormick |
| 6,002,387 A | * | 12/1999 | Ronkka et al. ............. 345/157 |
| 6,188,392 B1 | * | 2/2001 | O'Connor et al. .......... 345/179 |

* cited by examiner

Primary Examiner—Richard Hjerpe
Assistant Examiner—Jennifer T. Nguyen
(74) Attorney, Agent, or Firm—John Gugliotta; Olen L. York, III

(57) ABSTRACT

A device is provided for capturing complete analog motion, rather than digital events. A beam of columnated light, generated from a laser emitting diode, it directed at a clear, rotatable ball bearing having a series of reflecting indicia within the surface of the ball bearing. The reflection of columnated light off of these indicia makes the analog motion of the ball bearing a capturable, optical event. A sensor reads through the clear ball bearing and converts this motion into memory. The raw data then goes into the temporary RAM, which holds all excess data as other date is streamed into the microprocessors. Those processors change the raw data into digital code, which can then be understood and translated by most modern personal computers. The digital code can then be stored in the unit's non-volatile RAM, where it remains until it is uploaded into a PC resident software program.

12 Claims, 2 Drawing Sheets

OPTICAL MEMORY UNIT FOR CAPTURING COMPLETE ANALOG MOTION

RELATED APPLICATIONS

The present invention was first described in Disclosure Document Number 472,303 filed on Apr. 10, 2000, under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to digitizer stylus systems and the like and, more particularly, to a device for capturing complete analog motion, rather than digital events.

2. Description of the Related Art

The computer revolution has affected virtually every aspect of our lives. It is in the not-too-distant future that one could envision the personal computer as a necessary appliance in every household. In fact, a large percentage of American households own at least one personal computer. As these numbers continue to increase, the market for computer accessories that enhance the usability of computers is growing as well. However, most all of these accessories rely on computer data that has been inputted by keyboard at one time. If one can type reasonably well and has easy access to a computer, this drawback is not of much consequence, but there are many people who do not like to type or do not have easy access to a computer during their work day. Such people as doctors, engineers, salesmen and others who move from place to place during their workday often do not have time or space to pack a notebook computer. These people are then forced to write the pertinent data on paper and then retype it into a computer at a later time, thus effectively doubling their work load.

A search of the prior art did not disclose any patents that read directly on the claims of the instant invention; however, the following references were considered related.

The following patents disclose the design and function of a marking and counter pen probe:

U.S. Pat. No. 5,995,123 issued in the name of McCormick; and

U.S. Pat. No. D 413,871 issued in the name of McCormick.

The following patents describe a touchpad pen-input controller:

U.S. Pat. No. 5,995,084 issued in the name of Chan et al.; and

U.S. Pat. No. 5,883,622 issued in the name of Chan et al.

U.S. Pat. No. 5,866,856 issued in the name of Holtzman discloses a marking device for an electronic presentation board.

U.S. Pat. No. 5,251,163 issued in the name of Rouhani describes a keypointer for a single-hand computer keyboard.

U.S. Pat. No. 4,677,428 issued in the name of Bartholow discloses a cordless light pen.

U.S. Pat. No. 4,128,889 issued in the name of Ojima et al. describes a pen-type electronic digital calculator.

And, U.S. Pat. No. D 303,124 issued in the name of Li discloses the ornamental design for a data pen.

Consequently, a need has been felt for providing an apparatus and means by which written data, produced by a pen and paper, can be directly inputted into a personal computer.

SUMMARY OF THE INVENTION

It is therefore an object of the present invention to provide an improved digitizer stylus systems.

It is a feature of the present invention to provide an improved digitizer stylus systems for capturing complete analog motion, rather than digital events.

Briefly described according to one embodiment of the present invention, an optical memory unit is provided that is a pen that electronically records its movement while writing on a piece of paper. Upon initial observation, the invention looks remarkably like a large fountain pen. But upon closer observation, it can be seen the invention has special pressure transducers that record the various forces and directions encountered while writing. A special connector located at the upper end of the invention allows for the connection of a data transfer cable that permits downloading of the stored data into a personal computer via a serial connection. To use the invention, a user would write or draw on a conventional piece of paper in a normal fashion. All data in the form of letters, number and drawings would be recorded and stored in nonvolatile RAM in the invention. A light-emitting diode (LED) would indicate when the data reaches the capacity of the memory or RAM. At this point, the user would connect the invention to a personal computer and download the information via use of specialized drivers. Specialized software would then convert this into text or drawings for use in word processing or similar programs.

The use of the present invention provides users the ability to produce digital information using a conventional means like a pen and paper without having to retype the information via a keyboard or reproduce it via a scanner.

An advantage of the present invention is that allows data produced with pen and paper to be directly inputted to a personal computer.

Another advantage of the present invention is that it provides alternate means of data entry to keyboard, mouse, tablet, scanner, and the like.

Yet another advantage of the present invention is that it will function with any piece of paper.

In accordance with the present invention, use of pressure transducers records pressure and direction of pen used to reproduce letters, numbers, drawings, etc.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

The best mode for carrying out the invention is presented in terms of its preferred embodiment, herein depicted within the Figures.

1. Detailed Description of the Figures

Figure 1:
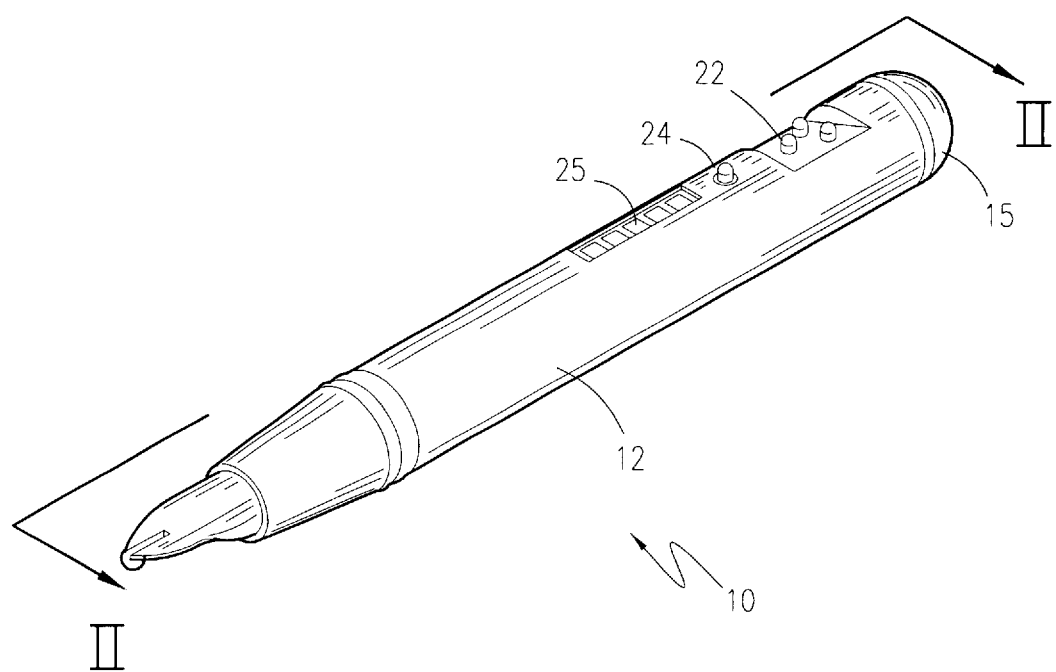
FIG. 1 is a front perspective view of an optical memory unit for capturing complete analog motion according to the preferred embodiment of the present invention.
Figure 2:
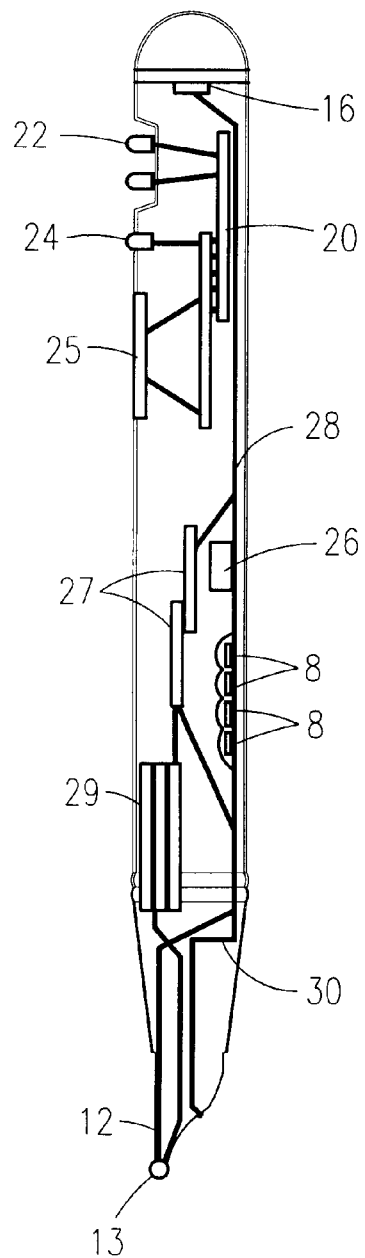
FIG. 2 is a cross sectional elevational view taken along line II—II of FIG. 1.

Referring now to FIGS. 1–2, an optical memory unit 10 is shown, according to the present invention, having a cylindrical, linearly elongated housing 12 of a pen-like configuration for allowing easy hand manipulation. A power supply 14 located in the proximal end 15 of the housing 12 provides electrical energy and communicates the electrical energy down the vertical, linear length of the housing 12 through a power bus 16 to the individual componentry, as will be described herein below. A non-volatile random access memory (RAM) 20 comprises the unit's main memory for storing finished analog and digital data. It is felt that, given currently available technology as well as the direction of future developments as they currently appear, 2 MB of formatted memory space should accommodate both the functionality of the present invention as well as the size constraints inherent to a pen-like configuration. An input and output port, or I/O port 22 is in electrical communication with the RAM 20, and allows physical connection through the sidewall of the housing 12 to an external computer source. It is currently envisioned that a standard plug type interface, such as IEEE1394 (firewire) standard, or equivalent, would satisfy this functional requirement. An external memory indicator, shown herein as a light emitting diode, or LED 24, communicates memory capacity from the RAM 20 to indicate to the user whether the memory storage capacity is full or available for additional storage. Additionally, a visual memory display means, such as a liquid crystal display, or LCD display 25, can communicate memory capacity form the RAM 20 in a visual manner, such as by showing the RAM 20 capacity by splitting the memory unit into available blocks and indicating the availability of block memory via the LCD display 25. A central processing unit, or CPU 27 controls the interpretation, storage, and retrieval functions of the optical memory unit 10, and directs communication to the various components along a communication bus (not shown). A temporary RAM 27 stores the raw input data and receives the initial data stream translated at high speed. Because of this requirement, it is envisioned that the temporary RAM 27 should be of significantly greater capacity, such as 100 MB. A plurality of microprocessors 28 computationally translate and compress the raw data from the RAM 27 into digital data to be communicated to and stored in the nonvolatile RAM 20. Analog motion sensors 29 receives input data concerning the angle at which the unit 10 is positioned relative to a reference plane as well as the acceleration or deceleration of the unit 10 and downward pressure placed upon the housing 12. In this manner, line width can be communicated as proportional to downward pen pressure.

Figure 4:
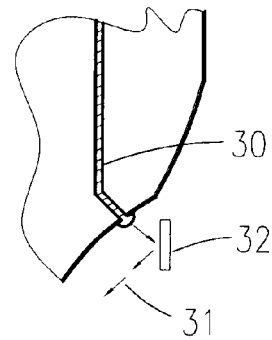
FIG. 4 is a partial expanded view taken about box B—B of FIG. 2.
Figure 3:
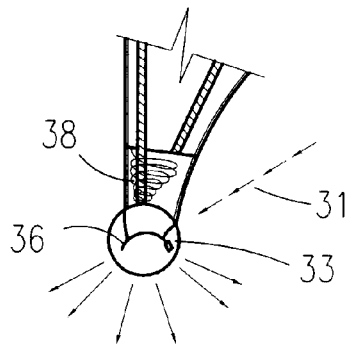
FIG. 3 is a partial expanded view of a laser emitting diode 30 for use herein taken about box A—A of FIG. 2.

In conjunction with FIG. 3, a laser emitting diode 30 formed of a fiber optic strand emitting a columnated beam of light 31 is reflected against a reflective mirroring object 32 that allows the light 31 to be directed through a transparent ball bearing 33. As shown in conjunction with FIG. 4, the light 31 is transmitted through the transparent ball bearing 33 and reflected against spacing indicia 36 scribed within or on the surface of the ball bearing 33. In this manner, the operation of the laser is similar to those used in color scanners that read the area of surface under the scanner element. In this context,. The reflection and direction of the indicia 36 makes the analog motion of the ball bearing 33 a capturable, optical event.

Finally, a pressure coil 38 provides downward pressure on the ball bearing 33, as well as providing input concerning downward pressure placed on the unit 10.

2. Operation of the Preferred Embodiment

In operation, as a user begins to write, the ball bearing presses against the pressure sensitive coil, which turns on the power. As strokes are made with the pen, the analog sensor receives each subtle motion. A laser reads through the clear ball bearing and converts this motion into memory.

The raw data then goes into the temporary RAM, which holds all excess data as other data is streamed into the microprocessors. Those processors change the raw data into digital code, which can then be understood and translated by most modern personal computers. The digital code is then stored in the unit's non-volatile RAM, where it remains until it is uploaded into a PC resident software program.

This process starts over every time the pen is lifted off the surface and put back down again.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. An optical memory unit for capturing complete analog motion comprising:

a cylindrical, linearly elongated housing of a pen-like configuration having a proximal end opposite a distal end for allowing easy hand manipulation;

optically transparent roller means located at said distal end for providing rotatable motion about a center point, said rotatable motion generated by and corresponding to two dimensional analog motion caused by writing with said housing against a planar surface;

optically reflective means supported by said roller means and forming a spaced indicia corresponding with a surface geometry of said roller means;

light transmission mean for directing a source of columnated light at said optically transparent roller means and reflect off said optically reflective means; and light reception means for receiving and recording reflected columnated light reflect off said optically reflective means.

2. The optical memory unit of claim 1, wherein said light transmission mean and light reception means are both housed within said cylindrical, linearly elongated housing.

3. The optical memory unit of claim 1, wherein said light transmission mean comprises:

a power supply located in said proximal end said housing for providing electrical energy and communicates the electrical energy down the vertical, linear length of the housing through a power bus; and a laser emitting diode in electrical communication with said power supply and formed of a fiber optic strand emitting a columnated beam of light reflected against a reflective mirroring object that allows the light to be directed through said optically transparent roller means.

4. The optical memory unit of claim 1, wherein said optically transparent roller means comprises a transparent ball bearing, and said optically reflective means comprises spacing indicia scribed within a surface of said ball bearing, wherein the reflection and direction of said indicia makes the analog motion of said ball bearing a capturable, optical event.

5. The optical memory unit of claim 4, further comprising a pressure coil for providing downward pressure on said ball bearing, as well as providing input to said light reception means concerning downward pressure placed on said ball bearing.

6. The optical memory unit of claim 5, further comprising analog motion sensors for receiving input data concerning the angle at which said housing is positioned relative to a reference plane as well as the acceleration or deceleration of said transparent ball bearing and downward pressure placed upon said transparent ball bearing.

7. The optical memory unit of claim 1, wherein said light reception means comprises:
   a non-volatile random access memory for providing main memory for storing finished analog and digital data;
   an input and output port in electrical communication with said non-volatile random access and allows physical connection through the sidewall of the housing to an external computer source;
   a central processing unit for controlling the interpretation, storage, and retrieval functions of said light reception means and directs communication along a communication bus;
   a temporary random access memory for storing raw input data and receiving an initial data stream from said reflected columnated light; and
   a plurality of microprocessors for computationally translating and compress raw data from said temporary random access memory into digital data to be communicated to and stored in said nonvolatile random access memory.

8. The optical memory unit of claim 7, further comprising an external memory indicator for communicating memory capacity from said non-volatile random access memory to indicate to the user whether the memory storage capacity is full or available for additional storage.

9. A method for capturing complete analog motion and converting and storing said analog motion to electronic data, said method comprising the steps:
   a. providing a cylindrical, linearly elongated housing of a pen-like configuration having a proximal end opposite a distal end for allowing easy hand manipulation;
   b. placing an optically transparent roller means at said distal end for providing rotatable motion about a center point, said rotatable motion generated by and corresponding to two dimensional analog motion caused by writing with said housing against a planar surface;
   c. forming a spaced indicia corresponding with a surface geometry of said roller means using an optically reflective means;
   d. providing and directing a source of columnated light at said optically transparent roller means and reflect off said optically reflective means: and
   e. receiving and recording reflected columnated light reflect off said optically reflective means;
wherein the reflection and direction of said indicia makes the analog motion of said ball bearing a capturable, optical event.

10. The method of claim 9, wherein the step of placing said optically transparent roller means further comprises selection of a transparent ball bearing having spacing indicia scribed within a surface of said ball bearing.

11. The method of claim 9, further comprising the steps:
   a. providing non-volatile random access memory for providing main memory for storing finished analog and digital data;
   b. inputting electrical communication within said non-volatile random access;
   c. communicating with a central processing unit for controlling the interpretation, storage, and retrieval functions of said light reception means and directs communication along a communication bus; and
   d. accessing temporary random access memory for storing raw input data and receiving an initial data stream from said reflected columnated light.

12. The method of claim 11, further comprising the steps:
   a. computationally translating and compress raw data from said temporary random access memory into digital data to be communicated to and stored in said nonvolatile random access memory.

* * * * *